United States Patent [19]

Rukavina

[11] Patent Number: 4,609,703

[45] Date of Patent: Sep. 2, 1986

[54] CYANOETHYLACRYLATE/ACRYLIC ACID COPOLYMER

[75] Inventor: Thomas G. Rukavina, Lower Burrell, Pa.

[73] Assignee: PPG Industries, Inc., Pittsburgh, Pa.

[21] Appl. No.: 741,501

[22] Filed: Jun. 5, 1985

Related U.S. Application Data

[62] Division of Ser. No. 615,191, May 30, 1984, Pat. No. 4,554,318.

[51] Int. Cl.$^4$ ............... C08L 33/02; C08L 63/10
[52] U.S. Cl. .................... 524/360; 524/555; 525/118; 525/119; 525/123; 525/374; 525/385; 526/298; 427/393.5; 427/404; 428/416; 428/461
[58] Field of Search ............ 526/298; 260/465.1; 560/215; 524/360, 555; 525/118, 119, 123, 374, 385

[56] References Cited

U.S. PATENT DOCUMENTS

| | | | |
|---|---|---|---|
| 2,379,297 | 6/1945 | Harmon et al. | 526/295 |
| 3,242,036 | 3/1966 | Victorius | 161/215 |
| 3,701,758 | 10/1972 | Maska | 260/78.5 |
| 4,154,914 | 5/1979 | Kuraya | 526/39 |
| 4,294,939 | 10/1981 | Taniguchi et al. | 525/118 |

*Primary Examiner*—Theodore E. Pertilla
*Attorney, Agent, or Firm*—Donna L. Seidel

[57] ABSTRACT

Novel copolymers of acrylic acid and cyanoethylacrylate, and the use of such copolymers as primers for bonding metal-containing coatings to organic polymer substrates, are disclosed. The copolymers of the present invention may be linear or crosslinked, may further comprise hydroxyethylacrylate, and are preferably of low molecular weight when used in solution as a primer.

12 Claims, No Drawings

CYANOETHYLACRYLATE/ACRYLIC ACID COPOLYMER

CROSS REFERENCE TO RELATED APPLICATION

This application is a division of U.S. Ser. No. 615,191 filed May 30, 1984 now U.S. Pat. No. 4,554,318.

BACKGROUND

The present invention relates generally to the art of organic polymers, and more particularly to the art of acrylate copolymers.

U.S. Pat. No. 4,154,914 to Kuraya teaches the copolymerization of an acrylic ester or esters with a malonic acid derivative having an active methylene to produce an acrylic rubber.

SUMMARY

The present invention involves the synthesis of a novel low molecular weight cyanoethylacrylate/acrylic acid copolymer which is particularly useful as a primer to bond metal-containing thin films to organic polymer substrates. The invention further comprises a terpolymer formed from cyanoethylacrylate, acrylic acid and hydroxyethylacrylate. The terpolymer is especially effective for bonding conductive metal oxide films to acrylic substrates.

DESCRIPTION OF THE PREFERRED EMBODIMENTS

The preferred low molecular weight cyanoethylacrylate/acrylic acid copolymer of the present invention is synthesized by a free radical initiated polymerization reaction of cyanoethylacrylate and acrylic acid. A preferred free radical initiator is 2,2'-azobis(isobutyronitrile). The polymerization is preferably carried out with cyanoethylacrylate and acrylic acid in solution. Cyclohexanone is a preferred solvent, and a concentration of about 25 percent monomer solids is particularly preferred.

The polymerization reaction is preferably carried out by dissolving cyanoethylacrylate and acrylic acid at about 25 percent total solids in cyclohexanone. The ratio of monomers is preferably about 2:1 acrylic acid to cyanoethylacrylate. A very small amount, typically less than 0.1 percent, of free radical initiator is also dissolved in the solvent. As the reaction solution is heated to about 90° C., 2,2'-azobis(isobutyronitrile) decomposes to form two free radicals with the evolution of nitrogen. The reaction solution is preferably held at a temperature of about 90° to 100° C. for about 24 hours to form a linear oligomer reaction product of cyanoethylacrylate/acrylic acid. The polymerization reaction proceeds as follows:

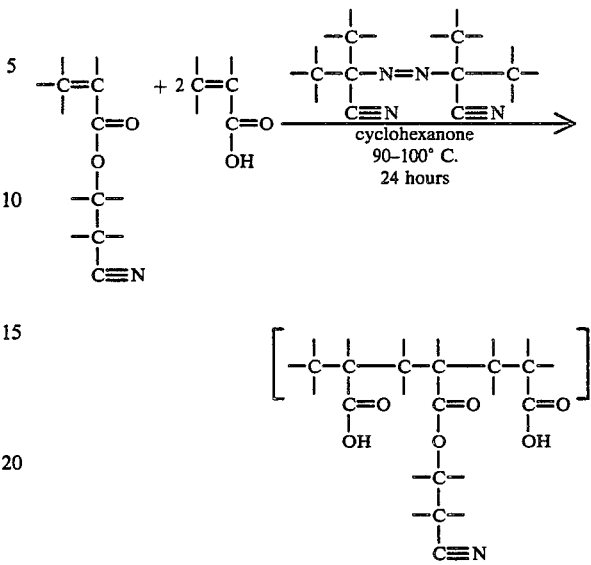

wherein x is ≧1. The cyanoethylacrylate/hydroxyethylacrylate/acrylic acid terpolymer of the present invention is formed by a similar free radical initiated polymerization reaction, preferably using cyanoethylacrylate, hydroxyethylacrylate and acrylic acid monomers in a molar ratio of about 3:5:2, respectively.

For use as primers in accordance with the present invention, the surface polarity of the linear copolymers and terpolymers described above is preferably such that the contact angle of water on the polymer surface is greater than 28° and less than 60°. The linear polymers are preferably crosslinked for use as primers in accordance with the present invention. Crosslinking improves the peel strength adhesion, dimensional stability and weather resistance of the polymers, and may be accomplished with crosslinking agents such as diepoxides and triisocyanates. A preferred crosslinking agent is 2-(3,4-epoxycyclohexyl-5,5-spiro-3,4-epoxy)-cyclohexane-meta-dioxane, which reacts with carboxylic acid groups without a catalyst at temperatures above 150° C., and at lower temperatures in the presence of a Lewis acid. Preferably, the crosslinking is carried out at a temperature no higher than 100° C. using a catalyst; dibutyltin dilaurate is preferred. The crosslinking reaction is illustrated below.

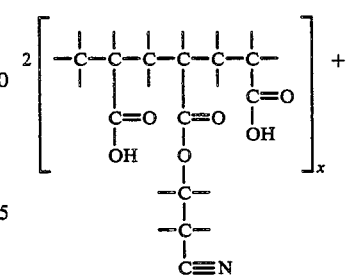

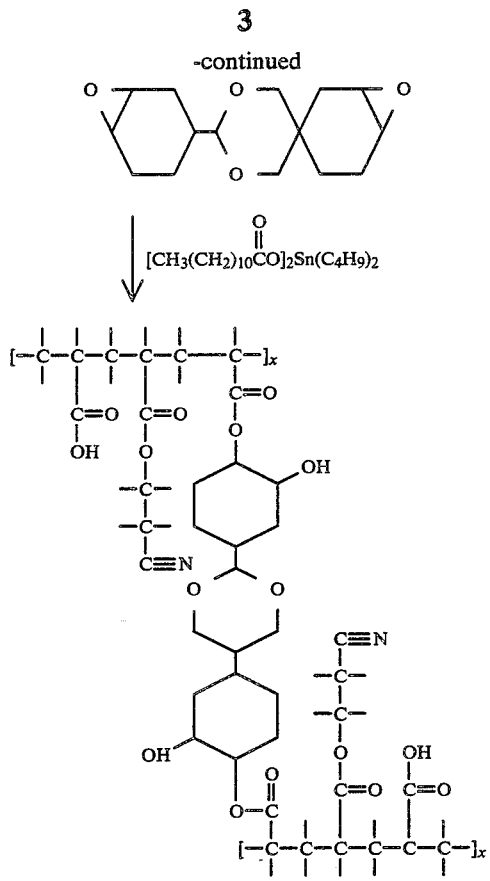

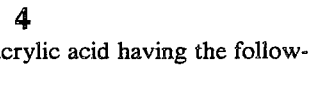

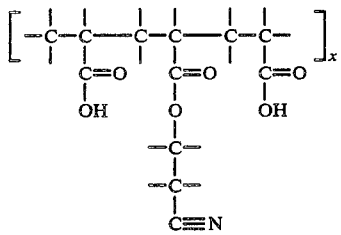

wherein x is such that the molecular weight is sufficiently low so that the oligomer remains soluble in cyclohexanone.

EXAMPLE II

The cyanoethylacrylate/acrylic acid oligomer of Example I is preferably crosslinked as follows. Dibutyltin dilaurate catalyst is dissolved at a concentration of 0.5 percent by weight of the oligomer in a solvent comprising 50 percent by volume each of cyclohexanone and acetone. The oligomer is then dissolved in the catalyst solution, to a final concentration of 10 percent solids, and the crosslinking agent is added, 2-(3,4-epoxycyclohexyl-5,5-spiro-3,4-epoxy)cyclohexane-metadioxane available from Union Carbide as ERL-4234 cycloaliphatic epoxide.

EXAMPLE III

For use as a primer to bond a conductive metal oxide film to an organic polymer substrate, a surfactant is added to the reaction solution of Example II. In this example, the surfactant is FC-430 from 3M Corporation added at a concentration of 0.03 percent of the total solution weight. The solution, containing 0.5 percent by weight of oligomer of dibutyltin dilaurate catalyst, is flow coated onto a surface of an acrylic substrate and cured at 200° F. (about 94° C.). The reaction of the crosslinking agent with acid groups in the polymer in a 1:2 ratio can be monitored by infrared analysis, which shows the disappearance of about 67 percent of the epoxide groups in 1 hour; 82 percent in 2 hours, and no further decrease after 2 hours.

EXAMPLE IV

A terpolymer is formed by the reaction of cyanoethylacrylate, hydroxyethylacrylate and acrylic acid in cyclohexanone (25 percent solids) using 0.04 percent azobis(isobutyronitrile) initiator as in Example I. The reaction is carried out at 130° C. for 30 minutes. The oligomer solution is then diluted to 1.25 percent solids with a 50/50 by volume cyclohexanone/acetone solvent. The primer solution, containing a triisocyanate crosslinking agent available as DES-N-75 from Mobay Chemical, is applied to a polymethylmethacrylate substrate surface. The solvent is evaporated and the oligomer crosslinked by heating to 200° F. (about 94° C.) for 30 minutes. Finally, the primed acrylic surface is coated with indium oxide by vacuum coating at 195° F. (about 90.5° C.).

While various uses of the cyanoethylacrylate/acrylic acid copolymers and terpolymers of the present invention are contemplated, a particularly preferred embodiment of the present invention involves employing the polymer as a primer to bond metal containing thin films to organic polymer substrates, particularly conductive metal oxide films to acrylic substrates for use in aircraft transparencies. For optimum adhesion, the polarity of the polymer is preferably such that the contact angle of water on the polymer is between 31° and 47°. For application, the reaction mixture is preferably further diluted with a compatible solvent and applied to a substrate surface. Heat is applied to evaporate the solvent, polymerize, and optionally crosslink, the reactants in situ.

The present invention will be further understood from the descriptions of specific examples which follow.

EXAMPLE I

A cyanoethylacrylate/acrylic acid copolymer is prepared by mixing cyanoethylacrylate and acrylic acid in a molar ratio of 0.5 at a total solids concentration of 25 percent in cyclohexanone. The reaction solution also contains 0.04 percent 2,2'-azobis(isobutyronitrile) which acts as a free radical chain reaction initiator. As the reaction solution is heated, the 2,2'-azobis(isobutyronitrile) decomposes, with the evolution of nitrogen, forming two free radicals which initiate the polymerization of the cyanoethylacrylate and acrylic acid. The reaction solution is held at a temperature of 90° to 100° C. for 24 hours to form an oligomer of cyanoethylacrylate and acrylic acid having the following structure For purposes of comparison, a vacuum deposited indium oxide film exhibits zero adhesion to an unprimed acrylic surface, a peel strength of 10 pounds per linear inch (pli) with a commercially available phenolic primer, 10 pli with a cyanoethylacrylate/acrylic acid copolymer having a molar ratio of 2:1, 20 to 30 pli with a cyanoethylacrylate/acrylic acid copolymer having a molar ratio of 1:2, and 115 to 165 pli with the cross-linked cyanoethylacrylate/acrylic acid copolymer of Example III.

The above examples are offered to illustrate the present invention. Various modifications such as different concentrations of reactants, other solvents, and varying reaction conditions are contemplated for producing a variety of copolymers. The ratio of acrylic acid and functional acrylic monomers may vary over a wide range; the structural formulae herein therefore represent a random segment rather than an exactly repeating unit of copolymers. When such copolymers are used as primers, substrates other than acrylic and coatings other than indium oxide are included within the scope of the present invention as defined by the following claims.

I claim:

1. A composition of matter comprising the polymerization reaction product of cyanoethylacrylate and acrylic acid having the structural formula

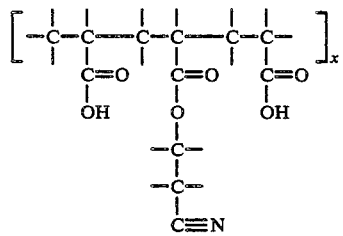

wherein x is $\geq 1$.

2. The composition according to claim 1, wherein the molecular weight of the polymer is sufficiently low so that the polymer is soluble in cyclohexanone.

3. A composition of matter comprising the polymerization reaction product of cyanoethylacrylate, hydroxyethylacrylate and acrylic acid having the structural formula

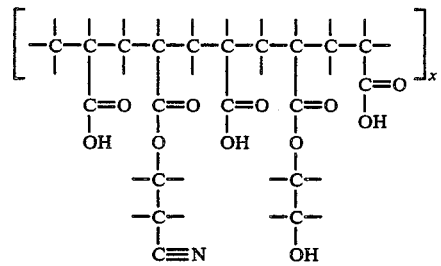

wherein x is $\geq 1$.

4. A method for synthesizing a copolymer of acrylic acid and functional acrylate comprising the steps of:
  a. dissolving in a compatible solvent acrylic acid, cyanoethylacrylate and hydroxyethylacrylate monomers;
  b. adding a free radical initiator;
  c. heating the solution to a sufficient temperature for a sufficient time to polymerize the monomers.

5. The method according to claim 4, wherein the free radical initiator is azobis(isobutyronitrile).

6. The method according to claim 5, wherein the solvent comprises cyclohexanone.

7. The method according to claim 6, wherein the solution is heated to a temperature in the range of 90° to 100° C. for about 24 hours.

8. A composition according to claim 1, wherein said reaction product is a low molecular weight cyanoethylacrylate/acrylic acid copolymer and said composition further comprises a solvent.

9. The composition according to claim 8, wherein the solvent comprises cyclohexanone.

10. The composition according to claim 9, wherein the concentration of the copolymer is about 1 to 10 percent.

11. The composition according to claim 8, wherein the copolymer is crosslinked with a crosslinking agent.

12. The composition according to claim 8, wherein the copolymer is a terpolymer of cyanoethylacrylate, hydroxyethylacrylate and acrylic acid.

* * * * *